US 8,085,426 B2

(12) United States Patent
Gaebel (10) Patent No.: US 8,085,426 B2
(45) Date of Patent: Dec. 27, 2011

(54) INTELLIGENT PAGE BUFFER ALLOCATION

(75) Inventor: Gary Lin Gaebel, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 976 days.

(21) Appl. No.: 11/562,815

(22) Filed: Nov. 22, 2006

(65) Prior Publication Data

US 2008/0117462 A1 May 22, 2008

(51) Int. Cl.
*G06K 15/00* (2006.01)

(52) U.S. Cl. ........ 358/1.17; 358/1.15; 711/119; 711/161

(58) Field of Classification Search .............. 358/1.13, 358/1.15, 1.16, 1.17, 400; 347/5; 400/76; 345/553; 711/119, 161
See application file for complete search history.

(56) References Cited

U.S. PATENT DOCUMENTS

| 5,592,594 | A | | 1/1997 | Cahoon | |
|---|---|---|---|---|---|
| 5,638,498 | A | * | 6/1997 | Tyler et al. | 358/1.16 |
| 5,682,249 | A | | 10/1997 | Harrington | |
| 5,977,993 | A | * | 11/1999 | Matsuda | 358/1.15 |
| 5,978,551 | A | | 11/1999 | Koyama | |
| 6,038,033 | A | * | 3/2000 | Bender et al. | 358/1.16 |
| 6,078,399 | A | * | 6/2000 | Kadota | 358/1.16 |
| 6,092,171 | A | | 7/2000 | Relph | |
| 6,137,589 | A | * | 10/2000 | Obrador et al. | 358/1.16 |
| 6,564,305 | B1 | | 5/2003 | Moore | |
| 6,567,180 | B1 | * | 5/2003 | Kageyama et al. | 358/1.15 |
| 6,707,945 | B2 | | 3/2004 | Hamzy et al. | |
| 6,711,294 | B1 | * | 3/2004 | Hamzy et al. | 358/1.16 |
| 6,870,633 | B1 | * | 3/2005 | Kadota | 358/1.15 |
| 7,038,805 | B1 | * | 5/2006 | Wegener | 358/1.16 |
| 2001/0015820 | A1 | | 8/2001 | Conrad et al. | |
| 2001/0024296 | A1 | * | 9/2001 | Sugiyama | 358/1.16 |
| 2002/0093506 | A1 | * | 7/2002 | Hobson | 345/553 |
| 2002/0131083 | A1 | * | 9/2002 | Hamzy et al. | 358/1.15 |
| 2003/0164991 | A1 | | 9/2003 | Matsui | |
| 2004/0165215 | A1 | | 8/2004 | Raguet et al. | |
| 2004/0184079 | A1 | | 9/2004 | Sakamoto | |
| 2005/0057780 | A1 | * | 3/2005 | Fujita et al. | 358/400 |
| 2005/0105124 | A1 | * | 5/2005 | Ogasawara | 358/1.15 |
| 2006/0045597 | A1 | * | 3/2006 | Leslie et al. | 400/76 |
| 2006/0133678 | A1 | * | 6/2006 | Yokota | 358/1.17 |
| 2006/0187248 | A1 | * | 8/2006 | Kimura et al. | 347/5 |
| 2007/0070377 | A1 | * | 3/2007 | Hirabayashi | 358/1.15 |
| 2007/0097395 | A1 | * | 5/2007 | Kaminogo | 358/1.13 |
| 2007/0097426 | A1 | * | 5/2007 | Nanaumi | 358/1.15 |

FOREIGN PATENT DOCUMENTS

| EP | 0585524 | 3/1994 |
|---|---|---|
| EP | 0613102 | 8/1994 |
| EP | 0727731 | 8/1996 |
| EP | 0798665 | 10/1997 |
| EP | 1011068 | 6/2000 |

(Continued)

*Primary Examiner* — Twyler Haskins
*Assistant Examiner* — Nicholas Pachol
(74) *Attorney, Agent, or Firm* — Stolowitz Ford Cowger LLP (57) ABSTRACT

An improved printer controller system includes bitmap buffers for storing bitmaps as uncompressed data and a buffer manager for managing an allocation of the bitmap buffers to the bitmaps. The buffer manager is configured to recap one of the bitmap buffers according to a bitmap identifier associated with a requested bitmap. A method for managing buffer allocation in a printer apparatus includes allocating one or more buffers to a bitmap, assigning a bitmap identifier to the one or more buffers, and printing the stored bitmap. The method further includes releasing the one or more buffers, receiving a request including the bitmap identifier, and reallocating the one or more buffers to the stored bitmap.

20 Claims, 5 Drawing Sheets

FOREIGN PATENT DOCUMENTS

| | | |
|---|---|---|
| EP | 0758178 | 8/2002 |
| EP | 1395035 | 3/2004 |
| GB | 2339490 | 1/2000 |
| JP | 5201075 | 8/1993 |
| JP | 6106813 | 4/1994 |
| JP | 2002264404 | 9/2002 |
| JP | 2004188943 | 7/2004 |
| JP | 2006027055 | 2/2006 |

* cited by examiner

| BUFFER 410 | BITMAP ID 420 | SEQ 430 | STATUS 440 |
|---|---|---|---|
| PBS 11 | BITMAP 5 | 1 | RELEASED |
| PBS 12 | BITMAP 5 | 1 | RELEASED |
| PBS 13 | BITMAP 5 | 1 | RELEASED |
| PBS 21 | BITMAP 2 | 2 | ALLOCATED |
| PBS 22 | BITMAP 2 | 2 | ALLOCATED |
| PBS 23 | BITMAP 2 | 2 | ALLOCATED |
| PBS 31 | NONE | 3 | RELEASED |
| PBS 32 | NONE | 3 | RELEASED |
| PBS 33 | NONE | 3 | RELEASED |

INTELLIGENT PAGE BUFFER ALLOCATION

BACKGROUND

The invention relates to an intelligent page buffer allocation system for a printer or copy machine.

Conventional printers and copy machines known in the art include memory buffers to store data or bitmaps of images that are included in a print job. The printer or copy machine may be requested to make multiple copies of the same print job. A print job may include multiple bitmaps or pages. The bitmaps may be printed on a wide variety of page sizes, such as 8½ by 11 inches, ledger size, legal size, 11 by 17 inches, A-3, A-4, A-5, etc. Certain bitmaps may require larger memory buffers to store the more data associated with a larger size page when compared to a smaller size page. Memory buffer requirements per bitmap may also be affected by a number of bits required to identify each pixel. A page may include one or more bitmaps, for example where each bitmap represents a different color, such as cyan, magenta or yellow. A separate bitmap may be associated with a black bitmap. A page that included cyan, magenta, yellow and black bitmaps may require four or more memory buffers—one for each bitmap.

An electronic document may be comprised of one or more bitmaps. A bitmap includes data that describes a pattern of pixels, or dots, that are printed on a page. The bitmap may include a fixed number of bits of data to describe each of the pixels. The bits may be used to describe both an intensity and color of the pixel. For example, a two bit pixel may describe an absence of color by a bit representation of [00] and may describe a black pixel by the bit representation of [11]. Lighter and darker shades of grey may be described by bit representations of [01] and [10], respectively. The number of bits per pixel may vary from one to eight or more to obtain even greater differences in intensity and color variation. The more bits that are assigned to a pixel increase the amount of memory that the bitmap will require.

A memory buffer is allocated to a bitmap in a print job prior to printing the bitmap and then released after the bitmap has been printed. The copy machine may include multiple memory buffers to accommodate the multiple bitmaps within a print job or to accommodate bitmaps of varying size. When a memory buffer is released, it may be allocated to a new bitmap for the same print job, or it may be allocated to a bitmap associated with a subsequent print job. When a second copy of a print job is requested, the bitmaps are decompressed from memory or a hard disk, and again stored in the memory buffers. The resubmitted bitmaps overwrite the prior data in the memory buffers. Decompressing the data consumes processor resources and requires a processing time that extends a length of time that is otherwise required to print the second copy of the print job.

The present invention addresses these and other problems associated with the prior art.

SUMMARY OF THE INVENTION

An improved printer controller system includes bitmap buffers for storing bitmaps as uncompressed data and a buffer manager for managing an allocation of the bitmap buffers to the bitmaps. The buffer manager is configured to recall one of the bitmap buffers according to a bitmap identifier associated with a requested bitmap. A method for managing buffer allocation in a printer apparatus includes allocating one or more buffers to a bitmap, assigning a bitmap identifier to the one or more buffers, and printing the stored bitmap. The method further includes releasing the one or more buffers, receiving a request including the bitmap identifier, and reallocating the one or more buffers to the stored bitmap.

The invention will become more readily apparent from the following detailed description of a preferred embodiment of the invention which proceeds with reference to the accompanying drawings.

DESCRIPTION OF EXAMPLE EMBODIMENTS

Printers and copy machines have long been used for printing single or multiple copies of a document. For example, a user may send a printer one or more pages of an electronic document and then select how many copies of the document will be printed by the printer. The user is therefore able to obtain multiple copies of the document without resending the electronic document or making multiple requests to copy the document.

A page may include multiple bitmaps. For example, a color page may include a black bitmap as well as one or more color bitmaps identified as cyan, magenta or yellow. Additional color bitmaps may also be employed in some instances. One, two, three or four or more bitmaps may be included on the same page depending on the number of color bitmaps that are required. When a page is printed, each of the bitmaps may be stored separately from each other in one or more memory buffers. Each of the bitmaps may be stored in a separate memory buffer. For convenience, both a printer and a copy machine will be referred to as simply a printer, hereafter. The printer is understood as being any device which prints electronic images or makes copies of printed documents, including graphic images.

Figure 1:
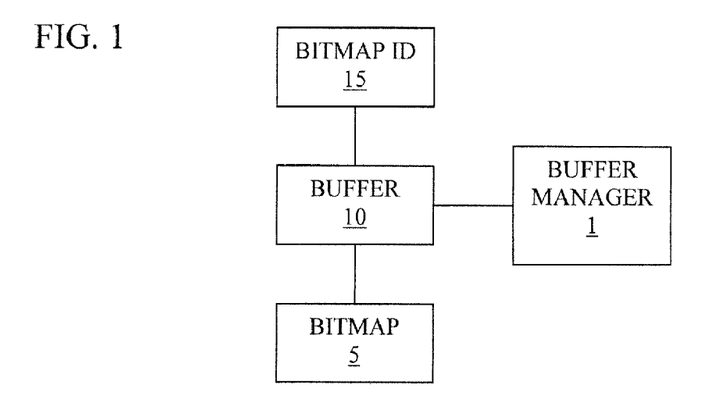
FIG. 1 illustrates an example block diagram of a buffer management system.

A printer may include a buffer manager 1 as shown in FIG. 1. The buffer manager 1 may include or communicate with a buffer 10 that is used to store a bitmap 5. Data that is received by the printer, for example as a data stream including page description language, commands and data, is converted into a bitmap, such as bitmap 5. The data may be converted into the bitmap 5 by the printer or by an external device, such as a personal computer. The buffer manager 1 may be one of a multiple of applications included in printer controller software.

The buffer 10 stores the bitmap 5 as uncompressed data for printing. The buffer manager 1 manages an allocation of bitmap buffers, such as buffer 10, with one or more bitmaps included in a print job, such as bitmap 5. The buffer manager 1 is configured to recall one or more of the bitmap buffers according to a bitmap identifier 15 associated with a requested bitmap 5. Buffer 10 may be sized to hold one bitmap, and may therefore be referred to as a bitmap buffer. In one embodiment, buffer 10 is sized to hold a bitmap associated with the most frequently used size page being printed by the printer. For example, the printer may typically print on A-4 size paper which may be provided in a default printer tray. If the printer receives a request to print a page that is larger than the most frequently used size, then the buffer manager 1 may allocate more than one buffer to the bitmap 5.

When the buffer 10 has been allocated to the bitmap 5 by the buffer manager 1, the bitmap identifier 15 is used by the buffer manager 1 to identify which bitmap was stored in buffer 10 when it was initially printed. Bitmap identifier 15 may be a tag, label or software variable. The bitmap identifier 15 may be associated with an address of the buffer 10 to provide a memory location of the bitmap 5. A request to reprint the bitmap 5 may therefore be identified by the buffer manager 1 as requesting the bitmap 5 that last resided in buffer 10. The buffer manager 1 may then reallocate buffer 10 to the same bitmap 5, which already resides in the buffer 10, so that the bitmap 5 may be reprinted without resubmitting the bitmap 5 to the buffer 10.

Figure 2:
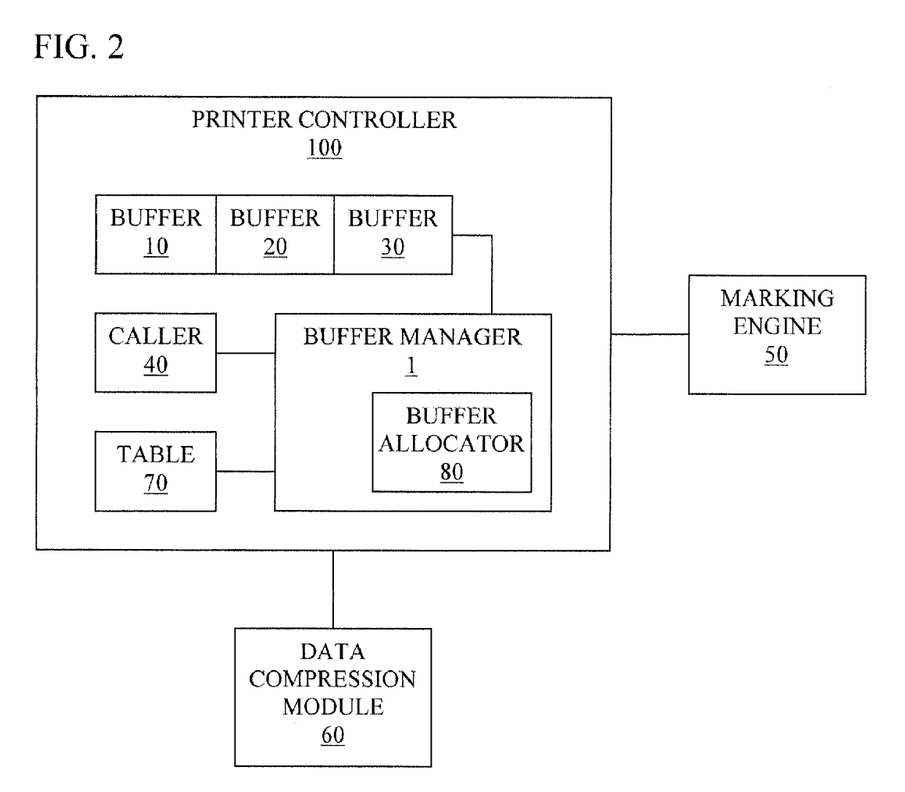
FIG. 2 illustrates an example block diagram of a printer controller including the buffer management system of FIG. 1.

FIG. 2 illustrates an example block diagram of a printer controller 100 including the buffer manager 1 of FIG. 1. The printer controller 100 may be comprised of software that includes other applications that are used to receive print jobs, request bitmaps and control data storage. A buffer allocator 80 may be provided in the printer controller to handle details of which buffers are in use, much like a librarian may track the books that are checked out in a library. The buffer allocator is shown as being part of the buffer manager 1. Multiple buffers such as buffers 10, 20 and 30 may be available to the buffer manager 1 for storing bitmaps, such as bitmap 5 of FIG. 1. The printer controller 100 is able to send a bitmap in one of the buffers 10-30 to a marking engine 50. The marking engine 50 may include hardware that puts toner or ink dots on the page, as well as any software required to operate the hardware. The hardware may include rollers, toner, transport belts, a fuser, a laser and other electronics.

Bitmap data may also be compressed. The compressed digital data requires less bytes of storage than the bitmap. The compressed data may be stored by a data compression module 60, which may include multiple compression cells. The compression module 60 may be provided as a software application or as a compression device capable of compressing digital data. The compressed digital data may be stored in a processor memory or on a hard drive, for example. A first bitmap that is stored in buffer 10 may be stored by the compression module 60 as compressed data. In one embodiment, the bitmap data is compressed after sending the bitmap to the marking engine 50. The buffer manager 1 may be configured to first determine if the requested bitmap is located in one of the bitmap buffers 10-30 and, if not, to decompress or regenerate the requested bitmap stored as compressed bitmap data.

A caller 40 included in the printer controller 100 may use the services of the buffer manager 1. The buffer manager services may be called or invoked by the caller 40, for example during a request to print a bitmap. Caller 40 may be a software module or software application. In one embodiment, the caller 40 is provided as part of the printer controller 100. The buffer manager services may include C language statements, for example. Table 70 is accessible to the buffer manager 1, and may be provided as part of the printer controller 100, in order to retain information associated with the buffers 10-30. The bitmap identifier 15 may be stored in table 70.

Figure 3:
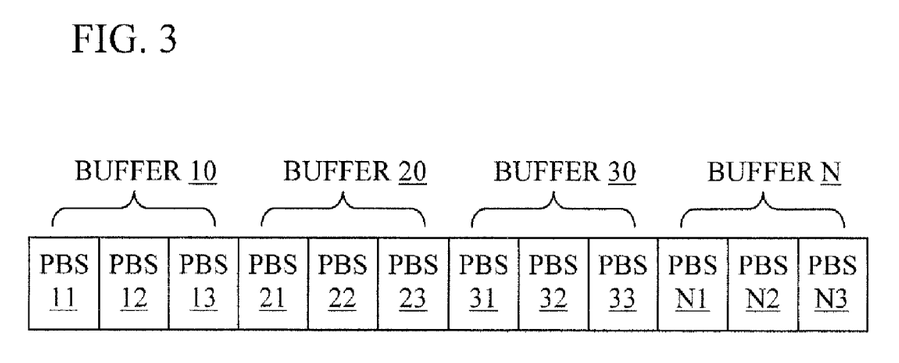
FIG. 3 illustrates an example block diagram of multiple buffers each including buffer sections.

According to one embodiment, the buffers 10-30 include buffer sections. FIG. 3 illustrates an example block diagram of multiple buffers each including buffer sections. For example, buffer 10 includes three buffer sections 11, 12 and 13. Buffer 20 may include three buffer sections 21, 22 and 23, and buffer 30 is shown as including three buffer sections 31, 32 and 33. There can be fewer or more than three buffers available to the buffer management system, as represented by buffer N. There can be fewer or more than three buffer sections per buffer. Although an equal number of buffer sections are shown for each buffer 10-30, some print jobs may use buffers having different numbers of buffer sections per buffer.

In one embodiment, each buffer section has an approximate memory size sufficient to hold a bitmap associated with the most frequently used size page being printed by the printer. Larger bitmaps may therefore be saved in a buffer including more than one buffer section. Providing for buffer sections, therefore, is one way of allocating memory within the buffer management system, to accommodate bitmaps that require different amounts of storage. The buffer sections associated with one of the buffers may be contiguous with regards to a memory location of the buffer sections in order to facilitate grouping of the buffer sections with a bitmap. For example, the buffer manager 1 may recall buffer section 11 of buffer 10 in order to access the bitmap that is stored in the three buffer sections 11-13. In one embodiment, the memory address of the first buffer section 11 is sufficient to recall the bitmap stored in buffer 10.

In one embodiment, the buffer allocator 80 in FIG. 2 may function to manage the details of the buffer sections 11-13, 21-23, and 31-33, whereas the buffer manager 1 may manage the buffers 10, 20 and 30.

Each buffer may include a different bitmap, and each of the bitmaps may include pixels in a different color plane. Therefore the buffers may alternatively be referred to as plane buffers, and the buffer sections may similarly be referred to as plane buffer sections. Hereafter, buffers and plane buffers are referred to collectively as buffers, whereas buffer sections and plane buffer sections are referred to collectively as buffer sections.

Figure 4:
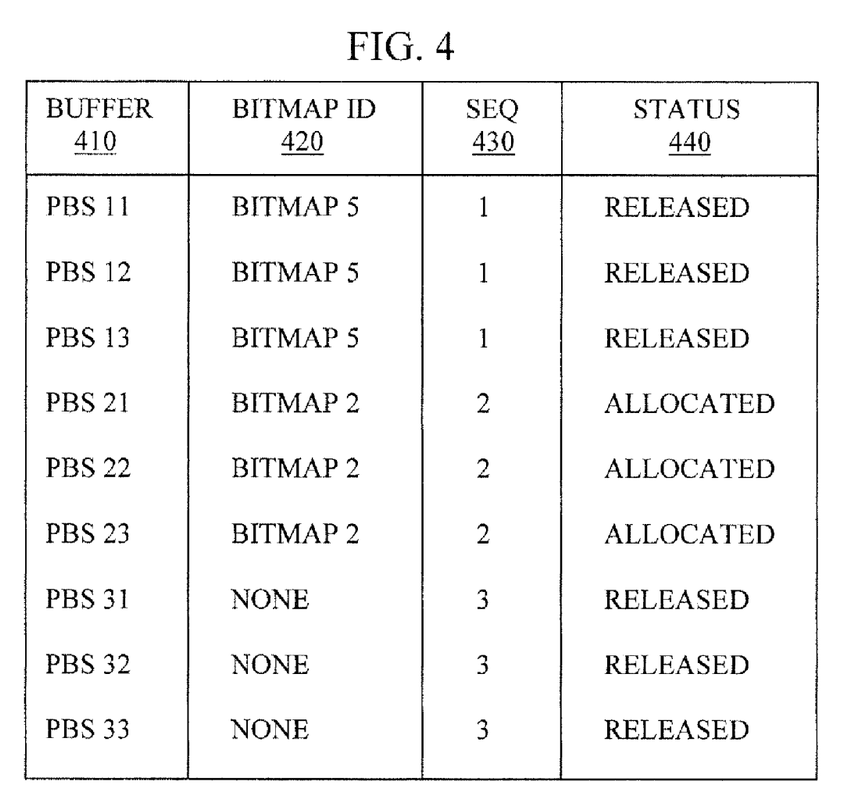
FIG. 4 illustrates an example block diagram of a data table including buffer section identifiers and allocation status.

FIG. 4 illustrates an example block diagram of a data table including fields for buffer section identifiers 410, bitmap identification 420, buffer section sequences 430 and allocation status 440. The table includes entries for the buffer sections 11-13, 21-23 and 31-33 of FIG. 3. Buffer section identifiers 410 may include a buffer section name or memory address for example, that uniquely identifies the buffer sections. Bitmap identification 420 may include a bitmap name or identifying number that is associated with a bitmap that is being stored in a buffer. For example, the buffer sections 11-13 of buffer 10 are shown as having been allocated to bitmap 5. Buffer sections 21-23 of buffer 20 are shown as having been allocated to a second bitmap 2. Buffer sections 31-33 are shown as not being allocated to any bitmap. The buffer sections 31-33 may include bits that have all been set to zeros. The bits may have been reset, or they may be set to zero because no buffer sections have yet been allocated to a bitmap. In one embodiment, table 70 of FIG. 2 includes the same or similar fields as shown in the table of FIG. 4.

The buffer section sequences 430 in the table of FIG. 4 indicate the order that the buffer sections are used to save the bitmap. For example, bitmap 5 may be stored in each of the three buffer sections 11-13. A first part of bitmap 5 may be stored on buffer section 11, whereas a second part of bitmap 5 may be stored on buffer section 12 and a third and final part of bitmap 5 may be stored on buffer section 13. Similarly, the second bitmap 2 may be stored on the three buffer sections 21-23. By maintaining the buffer section sequences 430, the allocation and release of the buffers may be managed as a bitmap is being saved in or retrieved from a buffer. In one embodiment, the buffer section sequence 430 is used to determine the buffer or buffer sections which are the least recently used. A contiguous group of bitmap buffers may be associated with a common bitmap identification 420, indicated as BIT-MAP 5 in FIG. 4 for buffer sections 11-13, for example.

The allocation status 440 in the table of FIG. 4 may be used to indicate whether a buffer is currently allocated to a bitmap, or if the buffer is available or released. For example, the buffer sections 11-13 associated with bitmap 5 are shown as being released, whereas the buffer sections 21-23 associated with bitmap 2 are shown as being allocated. Buffer sections 11-13 may have previously been allocated to bitmap 5 and then released after the bitmap 5 was printed. Although buffer sections 11-13 may be released, the bitmap 5 may continue to reside in the buffer sections 11-13. In such a way, buffer sections 11-13 may be reallocated to the bitmap 5 without resending the bitmap 5 to the buffer sections 11-13 and without regenerating the bitmap 5. Buffer sections 21-23 may currently be allocated to the second bitmap 2 due to a pending print job that includes the second bitmap 2. After the print job is complete, the buffer manager 1 of FIG. 2 may update the allocation status 440 to show the buffer sections 21-23 as being released.

The buffer manager 1 may be configured to maintain or register a time of use for each of the buffer sections. For example, table 70 in FIG. 2 might include information providing the time that the buffer sections were last allocated or last released. In one embodiment, the buffer manager 1 allocates the buffers or buffer sections according to which buffer sections are the least recently used. For example, assuming the bitmap identification 420 in FIG. 4 identifies bitmap 5 as being the first bitmap to be printed during a printing session and identifies bitmap 2 as being the second bitmap to be printed, as between the two, the buffer sections 11-13 associated with bitmap 5 would be the least recently used or least recently allocated. However, assuming buffer sections 31-33 have not yet been allocated to a bitmap, they may be considered the least recently used as among the three groups of buffer sections associated with buffers 10, 20 and 30 (reference FIG. 3). Assuming only three buffers 10, 20 and 30 are available to the buffer manager 1, after buffer sections 31-33 had been allocated to a third bitmap, buffer sections 11-13 would now be the least recently used buffer sections. Buffer manager may then determine to allocate buffer sections 11-13 to a fourth bitmap, for example.

In another embodiment, the bitmap identification 420 of FIG. 4 identifies both a page number and a color associated with one of the bitmaps. This information may be maintained in a separate field in other embodiments. Maintaining the page number and color information may provide further ability to manage the buffer allocation for multi-page or color print jobs.

Figure 5:
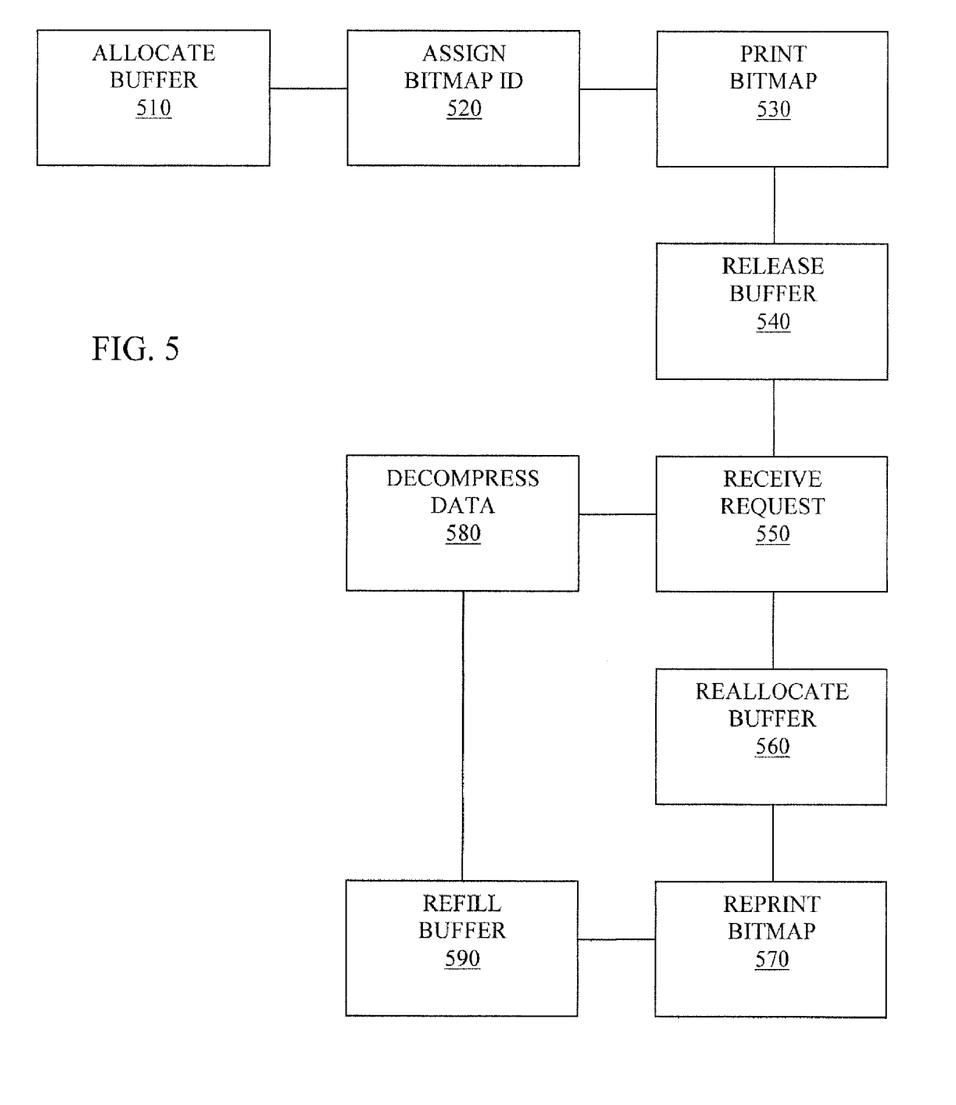
FIG. 5 illustrates an example method of managing buffer allocation.

FIG. 5 illustrates an example method of managing buffer allocation. The method may be performed by a printing apparatus or in the software utilized by the printing apparatus. In operation 510, one or more buffers such as buffer 10 in FIG. 1 is allocated to a bitmap, such as bitmap 5 of FIG. 1. As discussed above with reference to FIG. 3, buffer 10 may include buffer sections 11-13.

In operation 520, a bitmap identifier such as bitmap identifier 15 of FIG. 1 is assigned to the one or more buffers. The bitmap identifier 15 may include a page number or color of the bitmap 5. The buffer section identifiers 410, buffer section sequences 430 and allocation status 440 of FIG. 4 may be assigned to the buffers. When a buffer is allocated to a bitmap, the allocation status 440 may indicate an allocated status. A time of allocation of the buffers may be maintained by the buffer manager 1 or in the table 70 of FIG. 2.

Bitmap data of the bitmap 5 may also be compressed by the compression module 60 of FIG. 2. The compressed data may be saved by the compression module 60 prior to, concurrently with, or after the buffer 10 is allocated to bitmap 5. The compressed data may be stored in a processor memory or to a disk drive, for example.

At operation 530, the stored bitmap 5 in buffer 10 may be sent to the marking engine 50 of FIG. 2 to be printed. At operation 540, the buffer 10 may be released as further illustrated in FIG. 4 with respect to buffer sections 11-13.

In print jobs that are multi-page or that include colors, the print job may include more than one bitmap. For example, a second bitmap such as bitmap 2 may saved to a buffer such as buffer 20 and sent to the marking engine 50 to be printed. The second bitmap 2 may be associated with a second page of the print job, or it may be a second color bitmap associated with the same page as bitmap 5. Bitmap data of the second bitmap 2 may also be saved by compression module 60 of FIG. 2 as compressed data. The compressed data may be saved prior to, concurrently with, or after the buffer 20 is allocated to the second bitmap 2.

At operation 550, a request is received including the bitmap identifier, such as bitmap identifier 15 of FIG. 1. The request may be made to the buffer manager 1 by the caller 40 of FIG. 2. The buffer manager 1 may locate buffer sections associated with the bitmap identifier 15. For example, if the caller 40 requests the buffer or buffers associated with bitmap 5, the buffer manager 1 may search table 70 in FIG. 2 for all those buffer sections 11-13 that are identified by the bitmap identifier 15 for bitmap 5. In one embodiment, buffer sections 11-13 are selected according to a size of the bitmap, and according to a contiguous relationship of the buffer sections 11-13. A memory address of a first buffer section in the number of contiguous buffer sections associated with the bitmap may be used to identify the memory location of the bitmap. The request to print bitmap 5 in operation 550 may be understood as including a request to print a second copy of a print job including bitmap 5 as well as the second bitmap 2.

At operation 560, buffer 10 and associated buffer sections 11-13 are reallocated to the stored bitmap 5. At operation 570, bitmap 5 is reprinted. Bitmap 5 may be reprinted as stored in buffer 10 without decompressing the compressed data that was stored by compression module 60. Bitmap 5 may be reprinted without refilling the buffer 10, where buffer 10 is reallocated to the stored bitmap 5. Similarly, the second bitmap 2 may be reprinted from buffer 20, for example, wherein the buffer 20 is reallocated to the second bitmap 2 without decompressing any compressed data or regenerating the second bitmap 2. In this manner, a print job that includes both bitmap 5 and bitmap 2 may be reprinted two or more times without decompressing any data and without regenerating the bitmaps.

In some instances, bitmap 5 concurrently exists as uncompressed data in buffer 10 and as compressed data. However, where the buffer 10 has subsequently been allocated to a different bitmap, bitmap 5 may no longer be saved in the buffer 10, but may nevertheless reside in memory or on a hard drive as compressed data. In one embodiment, at operation 580 buffer 10 has been allocated to another bitmap. A new bitmap identifier may therefore be assigned to buffer sections 11-13 of buffer 10, to replace the previous bitmap identifier associated with bitmap 5. The buffer manager 1 may subsequently determine to allocate buffer 30, for example, to bitmap 5. The compressed data associated with bitmap 5 may be decompressed, regenerated as a bitmap, and stored in buffer 30 as uncompressed data. A bitmap identifier for buffer sections 31-33 may therefore be assigned to bitmap 5.

At operation 590, bitmap 5 is saved to one of the buffers 10-30. Bitmap 5 may be saved to the least recently used buffer. For example, buffer 10 may be the least recently used buffer if all remaining buffer sections have subsequently been allocated and released to bitmaps that were printed after the buffer 10 was last released. In one embodiment, the least recently used buffer will be allocated to a bitmap that is being decompressed or will be allocated to a new bitmap that has otherwise been generated as part of a print job. After saving bitmap 5 to one of the buffers, bitmap 5 may then be reprinted, as shown at operation 570.

Figure 6:
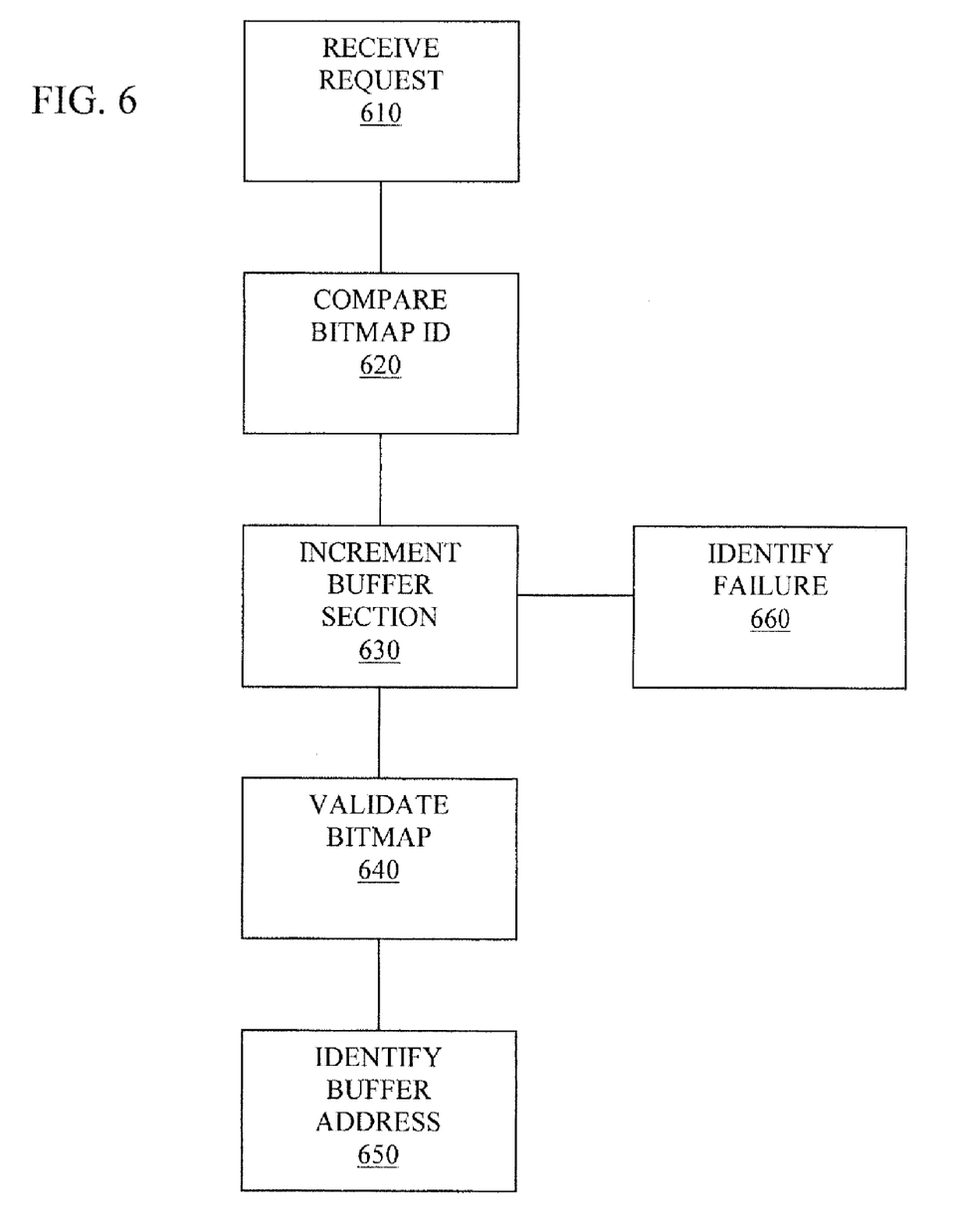
FIG. 6 illustrates an example method of reallocating buffer sections.

FIG. 6 illustrates an example method of reallocating buffer sections, such as buffer sections 11-13, 21-23 and 31-33 of FIG. 3. At operation 610, a request to reallocate buffers associated with a previously printed bitmap, such as bitmap 5 of FIG. 1 is received. The request may be sent to the buffer manager 1 by caller 40 of FIG. 2, and may include a bitmap identifier such as bitmap identifier 15 of FIG. 1. The request may also include a number of buffer sections, or a size of the bitmap that may used to determine a number of buffer sections required for holding the bitmap.

At operation 620, the bitmap identifier 15 included in the request is compared to the bitmap identification 420 associated with the buffer sections 11-13, 21-23 and 31-33 as shown in FIG. 4. For example, the request may include a bitmap identifier for bitmap 5. The first entry in the table in FIG. 4 including buffer section 11 may first be examined. The bitmap identification 420 is shown as being bitmap 5, which corresponds to the bitmap identifier 15 in the request.

At operation 630, a second entry in FIG. 4 including buffer section 12 may next be examined, according to an incremental examination of the buffer section identifications. The bitmap identification 420 is shown as being bitmap 5. The third entry in FIG. 4 including buffer section 13 may next be examined, after the entry is incremented to the next buffer section entry. The bitmap identification 420 is also shown as being bitmap 5, which corresponds to the bitmap identifier 15 in the request.

At operation 640, the number of sections in table 70 in FIG. 2 identified as being associated with the bitmap identifier 15 is compared to the number of sections that correspond to the requested bitmap. If the number of sections identified in the table of FIG. 4 are the same as the number of sections corresponding to the requested bitmap, then the bitmap stored in buffer 10 of FIG. 1 is validated. In operation 650, a memory address location of the first buffer section is identified, for example the memory address location of buffer section 11 may be identified for bitmap 5. A success response to the request or a request status code may be provided to caller 40 in FIG. 2.

If at operation 630 it is instead determined that the request for bitmap 5 fails or may not be satisfied, then a failure response to the request may be identified at operation 660. For example, the number of sections in table 70 in FIG. 2 may not be the same as the number of sections corresponding to the requested bitmap. This may happen, for example, when one or more of the buffer sections have subsequently been allocated to a different bitmap. A failure response may be provided to controller 40 in FIG. 2. In the event of a failed response, a request may be sent from the printer controller 100 to the data compression module 60 in order to decompress bitmap data that is associated with the requested bitmap.

Figure 7:
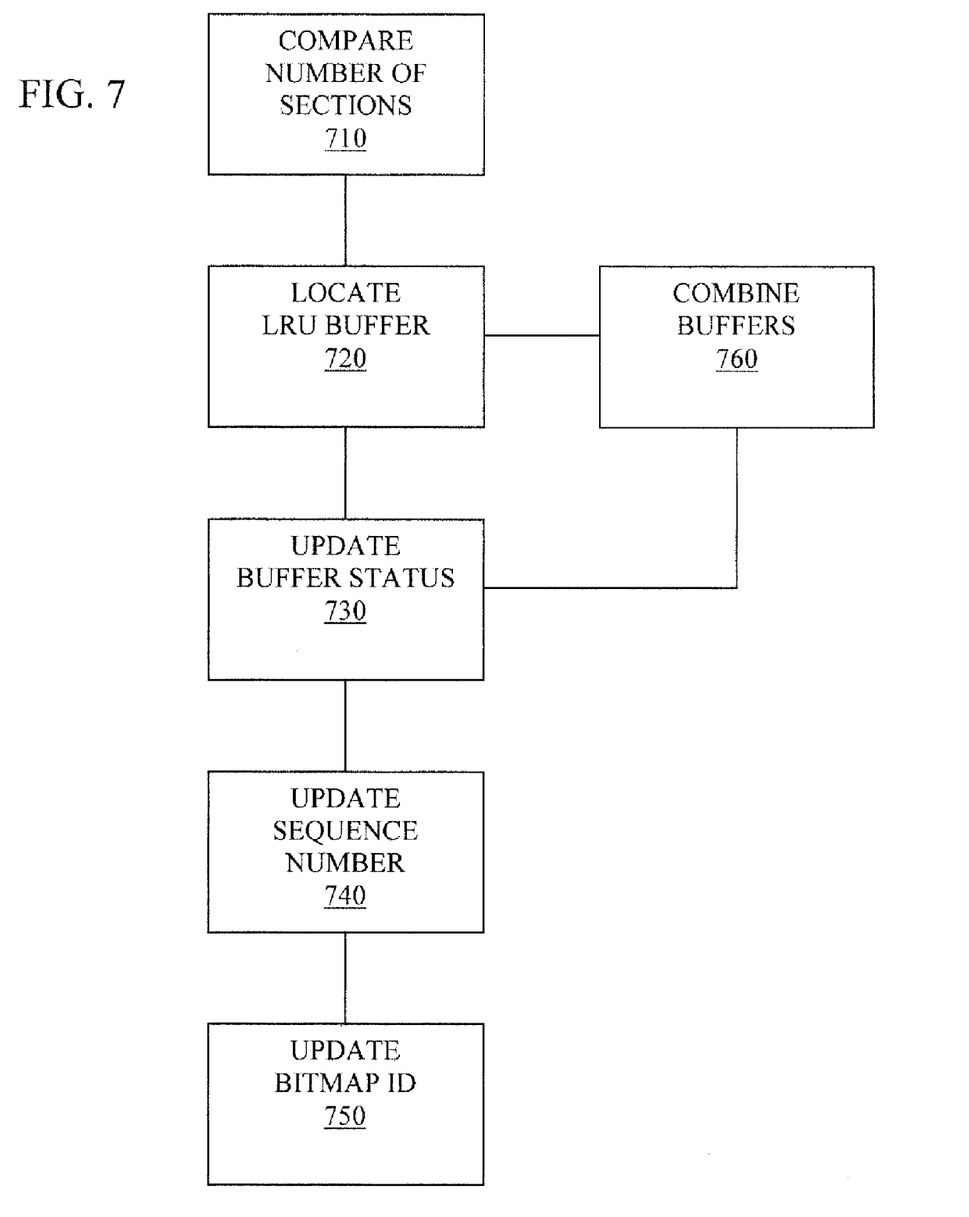
FIG. 7 illustrates an example method of allocating buffer sections.

FIG. 7 illustrates an example method of allocating buffer sections, such as buffer sections 11-13, 21-23 and 31-33 of FIG. 3. The allocation of buffer sections may be in response to a bitmap that is generated as part of a new print job, or it may include allocation or reallocation of a buffer section to a bitmap that was included in an existing or previously released print job. As before, the request, may include a bitmap identification, a number of buffer sections or memory size allocation for the bitmap.

At operation 710, a buffer is located that includes a number of buffer sections that correspond to a size of the requested bitmap or to the number of buffer sections included in the request. One criterion for locating the number of buffer sections may be that the buffer sections are all contiguous in memory location. In one embodiment, a buffer including more buffer sections than requested may be located or identified if a buffer having the same number of buffer sections as the requested bitmap is not found or is not available.

At operation 720, where there is more than one buffer located in operation 710, the least recently used buffer is selected. In one embodiment, the least recently used buffer or buffers are first identified, and then compared against the number of buffer sections corresponding to the requested bitmap.

At operation 730, the selected buffer sections are allocated to the requested bitmap, and table 70 of FIG. 2 is updated to provide a current buffer status of the selected buffer sections. For example, the selected buffer sections may be identified in the buffer status field as being allocated.

At operation 740, the sequence numbers of the buffer sequence numbers of the selected buffer sections are updated in table 70 of FIG. 2. At operation 750, the bitmap identifications of the selected buffer sections are updated in table 70 of FIG. 2.

Buffer status, buffer sequence numbers, and bitmap identifications identified in operations 730-750 may be similar to or the same as the fields shown in the table of FIG. 4 and identified as buffer status 440, buffer sequence numbers 430, and bitmap identification 420.

A success response may be provided to controller 40 in FIG. 2. upon successful completion of the buffer allocation. A failure response may be provided to controller 40 in FIG. 2 if the buffer allocation fails. For example, if a number of available buffer sections cannot be located that correspond to the requested bitmap, this may be perceived by a buffer management system as a failure.

In one embodiment, if a desired number of available buffer sections are not found, for example there are not a sufficient number of contiguous buffer sections included in a single buffer that correspond to the requested bitmap, then two or more buffers may be combined at operation 760. In one embodiment, the two or more buffers that are combined are contiguous. Table 70 in FIG. 2 may be updated for each of the two or more buffers with respect to a bitmap identification and buffer status, as described in operations 730 and operation 740. The combined buffers may include buffer sections that are identified in table 70 by incremental sequence numbers, as indicated in operation 750.

In one embodiment, rather than using a least recently used algorithm to locate or select a buffer to allocate to a requested bitmap, the buffer manager 1 of FIG. 1 may determine to reallocate a most recently used buffer section. For example, where a print job includes bitmaps with a combined memory requirement that exceeds the memory buffer size of the buffer management system, the buffer manager 1 may determine to reallocate the most recently used buffer section once the remaining buffers have been allocated to other bitmaps associated with the current print job. In this way, once the final bitmap in a print job has been saved to the most recently used buffer section, the buffer manager may reallocate the least recently used buffer sections to bitmaps which were filed first in time during an initial printing of the print job. A subsequent request to make a copy of the print job may be managed by the buffer manager without having to regenerate or decompress the bitmaps which were filed first in time.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A printer controller system comprising:
   bitmap buffers residing in a printer for storing bitmaps as uncompressed data, where the bitmaps are identified by a bitmap identifier and a sequence of allocation;
   a memory device configured to store the bitmaps as compressed data that is accessible for reprinting one or more of the bitmaps;
   a buffer manager configured to manage the sequence of allocation of the bitmap buffers to the bitmaps, where the buffer manager is configured to recall one of the bitmaps from the bitmap buffers according to the bitmap identifier associated with a requested bitmap, where the requested bitmap was previously printed corresponding to the sequence of allocation, and where the requested bitmap is concurrently saved in the bitmap buffers as the uncompressed data and in the memory device as the compressed data; and
   a marking engine configured to preferentially reprint the requested bitmap directly from the uncompressed data of the bitmap buffers and without accessing the compressed data of the memory device.

2. The printer controller system according to claim 1 including a contiguous group of bitmap buffers that is associated with the bitmap identifier.

3. The printer controller system according to claim 1 where the buffer manager allocates the bitmap buffers according to which bitmap buffers are the least recently used as determined from the sequence of allocation, and where different bitmaps are assigned different sequences of allocation.

4. The printer controller system according to claim 1 where the bitmap identifier is associated with an address of the bitmap buffers.

5. The printer controller system according to claim 1 including a compression module which saves the bitmaps as the compressed data in the memory device, where the buffer manager is configured to:
   determine if the requested bitmap has been overwritten in the bitmap buffers with another bitmap; and
   access the compressed data in the memory device in response to determining that the requested bitmap has been overwritten.

6. The printer controller system according to claim 1 where the bitmap identifier identifies both a page number and a color associated with one of the bitmaps.

7. The printer controller system according to claim 1 including a data table that stores the bitmap identifier, the sequence of allocation, and an allocation status that identifies which of the bitmap buffers are presently allocated to a print job or have been released.

8. A method for managing buffer allocation in a printer apparatus comprising:
   allocating one or more buffers residing in the printer apparatus to a bitmap;
   storing the bitmap in the one or more buffers as uncompressed bitmap data;
   storing the bitmap in a memory device as compressed bitmap data, where the bitmap is stored concurrently in both the one or more buffers and the memory device;
   assigning a bitmap identifier to the one or more buffers;
   printing the stored bitmap from the uncompressed bitmap data;
   releasing the one or more buffers;
   receiving a request to print the stored bitmap associated with the bitmap identifier;
   determining if the stored bitmap is still stored in the one or more buffers;
   reallocating the one or more buffers to the stored bitmap; and
   in response to determining that the stored bitmap is still stored in the one or more buffers, reprinting the stored bitmap directly from the uncompressed bitmap data stored in the one or more buffers and without decompressing the compressed bitmap data of the memory device, where the stored bitmap is reprinted without refilling the one or more buffers.

9. The method for managing buffer allocation according to claim 8, further comprising:
   saving a second bitmap in the one or more buffers; and
   printing the second bitmap, where the stored bitmap is reprinted after printing the second bitmap.

10. The method for managing buffer allocation according to claim 8 including allocating the one or more buffers to a new bitmap after all remaining buffers have been allocated and released, where the one or more buffers are identified as the least recently used.

11. The method for managing buffer allocation according to claim 10 including assigning a new bitmap identifier to the one or more buffers.

12. The method for managing buffer allocation according to claim 8 including comparing the one or more buffers that are assigned the bitmap identifier with a number of buffer sections identified by the request to determine if a complete bitmap is stored in the one or more buffers, where the bitmap is reprinted directly from the uncompressed bitmap data if it is determined that the complete bitmap is stored in the one or more buffers.

13. The method for managing buffer allocation according to claim 8 including:
   receiving a request to print a print job comprising a first bitmap, a second bitmap, and a final bitmap, where the print job comprises a combined memory requirement that exceeds the one or more buffers; and
   reallocating the one or more buffers according to a most recently used buffer section once the one or more buffers have been fully allocated, where the final bitmap is stored in the most recently used buffer section previously allocated to the second bitmap.

14. The method for managing buffer allocation according to claim 13 including:
receiving a request to reprint the print job, where the first bitmap is stored in a least recently used buffer section of the one or more buffers; and
reprinting the first bitmap without refilling the one or more buffers.

15. A non-transitory computer-readable medium having stored thereon computer-executable instructions that, in response to execution by a computing device of a printing system, cause the printing system to perform operations comprising:
allocating one or more buffer sections to a bitmap;
storing the bitmap in the one or more buffer sections as uncompressed bitmap data;
storing the bitmap in memory as compressed bitmap data, where the bitmap is stored concurrently in both the one or more buffer sections and the memory;
assigning a bitmap identifier to the one or more buffer sections;
printing the bitmap from the uncompressed bitmap data;
releasing the one or more buffer sections from the allocation;
storing a second bitmap in the one or more buffers;
printing the second bitmap;
receiving a request to reprint the bitmap after printing the second bitmap, where the request identifies the bitmap identifier and a number of buffer sections associated with the bitmap;
analyzing the one or more buffer sections for a reference to the bitmap identifier;
comparing the one or more buffer sections that reference the bitmap identifier with the number of buffer sections identified by the request, to determine if a complete bitmap is stored in the one or more buffer sections; and
in response to determining that the complete bitmap is stored in the one or more buffer sections, reprinting the bitmap directly from the uncompressed bitmap data without decompressing the compressed bitmap data in the memory, where the complete bitmap and the second bitmap are concurrently stored in the one or more buffers.

16. The non-transitory computer-readable medium according to claim 15 further comprising:
determining that the one or more buffer sections reference the bitmap identifier; and
reallocating the one or more buffer sections to the bitmap.

17. The non-transitory computer-readable medium according to claim 15 where the one or more buffer sections are allocated to the bitmap according to which of the buffer sections is least recently used.

18. The non-transitory computer-readable medium according to claim 15 further comprising selecting a number of contiguous buffer sections according to a size of the bitmap.

19. The non-transitory computer-readable medium according to claim 18 further comprising identifying a memory address of a first buffer section in the number of contiguous buffer sections associated with the bitmap to identify a location of the bitmap in the one or more buffer sections.

20. The non-transitory computer-readable medium according to claim 15 further comprising accessing the compressed data in the memory in response to determining that at least part of the bitmap has been overwritten in the one or more buffer sections with another bitmap.

\* \* \* \* \*

UNITED STATES PATENT AND TRADEMARK OFFICE
CERTIFICATE OF CORRECTION

| | | |
|---|---|---|
| PATENT NO. | : 8,085,426 B2 | Page 1 of 1 |
| APPLICATION NO. | : 11/562815 | |
| DATED | : December 27, 2011 | |
| INVENTOR(S) | : Gary Lin Gaebel | |

It is certified that error appears in the above-identified patent and that said Letters Patent is hereby corrected as shown below:

Title page, column 2, Abstract at line 4:   Delete "recap" and insert -- recall --, therefor.

Signed and Sealed this
Sixth Day of November, 2012

David J. Kappos
*Director of the United States Patent and Trademark Office*